United States Patent
Yankov et al.

(10) Patent No.: US 12,120,260 B2
(45) Date of Patent: Oct. 15, 2024

(54) COMPUTING SYSTEM THAT GENERATES A PREDICTED ROUTINE OF A USER

(71) Applicant: Microsoft Technology Licensing, LLC, Redmond, WA (US)

(72) Inventors: Dragomir Dimitrov Yankov, Sunnyvale, CA (US); Michael Robert Evans, London (GB); Renzhong Wang, Redmond, WA (US); Senthil Kumar Palanisamy, Kenmore, WA (US); Siddhartha Cingh Arora, Redmond, WA (US); Alex Jordan Yuter, Seattle, WA (US); Beibei Cheng, Redmond, WA (US); Wei Wu, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 314 days.

(21) Appl. No.: 17/397,467

(22) Filed: Aug. 9, 2021

(65) Prior Publication Data
US 2021/0368036 A1      Nov. 25, 2021

Related U.S. Application Data

(63) Continuation of application No. 16/460,241, filed on Jul. 2, 2019, now abandoned.

(51) Int. Cl.
*H04M 1/72451*     (2021.01)
*G06N 3/049*       (2023.01)
(Continued)

(52) U.S. Cl.
CPC ........ *H04M 1/72451* (2021.01); *G06N 3/049* (2013.01); *H04L 51/046* (2013.01); *H04W 4/029* (2018.02)

(58) Field of Classification Search
CPC .. H04M 1/72451; H04W 4/029; H04L 51/046
See application file for complete search history.

(56) References Cited

U.S. PATENT DOCUMENTS

| 9,009,093 B1 | 4/2015 | Omoigui |
| 10,140,785 B1 | 11/2018 | Cox et al. |

(Continued)

FOREIGN PATENT DOCUMENTS

WO    2013192591 A2    12/2013

OTHER PUBLICATIONS

Macedo, et al., "Context- Aware Event Recommendation in Event-based Social Networks", In Proceedings of the 9th ACM Conference on Recommender Systems, Sep. 16, 2015, 8 Pages.

(Continued)

*Primary Examiner* — Amal S Zenati
(74) *Attorney, Agent, or Firm* — Calfee, Halter & Griswold LLP

(57) ABSTRACT

Described herein are technologies related to generating a predicted routine of a user of a mobile computing device. Location entries generated by the mobile computing device are processed to generate visit entries, wherein the visit entries are representative of visits made by the user to places over several days. An input sequence of states is constructed based upon the visit entries, wherein each state has a place identifier assigned thereto, and further wherein each state corresponds to a time interval of predefined length. A predicted routine of the user is generated based upon the input sequence of states.

20 Claims, 10 Drawing Sheets

(51) Int. Cl.
H04L 51/046 (2022.01)
H04W 4/029 (2018.01)

(56) References Cited

U.S. PATENT DOCUMENTS

| 10,592,777 | B2 | 3/2020 | Meshi et al. |
| 2013/0226857 | A1 | 8/2013 | Shim et al. |
| 2013/0297551 | A1* | 11/2013 | Smith .................. H04L 51/222 706/48 |
| 2015/0248651 | A1 | 9/2015 | Akutagawa et al. |
| 2016/0127873 | A1* | 5/2016 | Yoon .................. G06Q 10/109 455/456.1 |
| 2016/0321551 | A1* | 11/2016 | Priness ................. G06N 5/047 |
| 2017/0104832 | A1 | 4/2017 | Bostick et al. |
| 2021/0006650 | A1 | 1/2021 | Yankov et al. |

OTHER PUBLICATIONS

Bai, et al., "An Empirical Evaluation of Generic Convolutional and Recurrent Networks for Sequence Modeling", In arXiv preprint arXiv:1803.01271, Apr. 19, 2018, 14 Pages.

Derya, et al., "ST-DBSCAN: An Algorithm for Clustering Spatial-Temporal Data", Data & Knowledge Engineering 60, Mar. 13, 2006, pp. 1-14.

Devlin, et al., "BERT: Pre-training of Deep Bidirectional Transformers for Language Understanding", In the Repository of arXiv: 1810.04805, Oct. 11, 2018, 14 Pages.

Feng, et al., "DeepMove: Predicting Human Mobility with Attentional Recurrent Networks", In Proceedings of the World Wide Web Conference, Apr. 10, 2019, 5 Pages.

Karatzoglou, et al., "A Seq2Seq Learning Approach for Modeling Semantic Trajectories and Predicting the Next Location", In Proceedings of the 26th ACM Sigspatial International Conference on Advances in Geographic Information Systems, Nov. 6, 2018, 4 Pages.

Lozano, et al., "Learning and User Adaptation in Location Forecasting.", In Proceedings of the ACM Conference on Pervasive and Ubiquitous Computing Adjunct Publication, Sep. 8, 2013, 10 Pages.

Luong, et al., "Effective approaches to attention-based neural machine translation", In Journal of Computing Research Repository, Aug. 17, 2015, 10 Pages.

Quadrana, et al., "Sequence-Aware Recommender Systems", In Proceedings of the ACM Computing Surveys, vol. 51, Issue 4, Feb. 23, 2018, 35 Pages.

Rehman, et al., "A comparative study of location-based recommendation systems", In Proceedings of the Knowledge Engineering Review, vol. 32, Oct. 20, 2017, 36 Pages.

Whiting, et al., "Urban Maps of Social Activity", In Proceedings of the Twelfth International Conference on Web and Social Media, Jun. 25, 2018, 2 Pages.

Wu, et al., "Where Did You Go: Personalized Annotation of Mobility Records", In Proceedings of the 25th ACM International on Conference on Information and Knowledge Management, Oct. 24, 2016, 10 Pages.

Ye, et al., "Exploiting Geographical Influence for Collaborative Point-of-interest Recommendation.", In Proceedings of the 34th International ACM SIGIR Conference on Research and Development in Information Retrieval, Jan. 1, 2011. 10 Pages.

Yu, et al., "Multi-Scale Context Aggregation by Dilated Convolutions", Published as a conference paper at ICLR 2016, May 8, 2016, 13 Pages.

Ying, et al., "Mining Geographic-temporal-semantic Patterns in Trajectories for Location Prediction.", In Proceedings of the ACM Transactions on Intelligent Systems and Technology, vol. 5, Issue 1, Jan. 1, 2014, 34 Pages.

Ye, et al., "Mining Individual Life Pattern Based on Location History", In Proceedings of the 10th International Conference on Mobile Data Management: Systems, Services and Middleware, May 18, 2009, 10 Pages.

"Non-Final Office Action for U.S. Appl. No. 16/460,241", Mailed Date: Nov. 4, 2019, 12 Pages.

"Reply to Non-Final Office Action for U.S. Appl. No. 16/460,241", Filed Date: Jan. 15, 2020, 13 Pages.

He, et al., "Temporal Convolutional Network for Anomaly Detection in Time Series", In Journal of Physics: Conference Series, vol. 1213, Issue 4, Jun. 1, 2019, 10 Pages.

"Non-Final Office Action for U.S. Appl. No. 16/460,241", Mailed Date: May 1, 2020, 22 Pages.

"International Search Report and Written Opinion issued in PCT Application No. PCT/US20/032772", Mailed Date: Jul. 1, 2020, 10 Pages.

"Reply to Non-Final Office Action for U.S. Appl. No. 16/460,241", Filed Date: Oct. 1, 2020, 9 Pages.

"Final Office Action for U.S. Appl. No. 16/460,241", Mailed Date: Feb. 8, 2021, 17 Pages.

"Reply to Final Office Action for U.S. Appl. No. 16/460,241", Filed Date: Jun. 8, 2021, 11 Pages.

"Advisory Action for U.S. Appl. No. 16/460,241", Mailed Date: Jun. 21, 2021, 2 Pages.

* cited by examiner

COMPUTING SYSTEM THAT GENERATES A PREDICTED ROUTINE OF A USER

RELATED APPLICATION

This application is a continuation of U.S. patent application Ser. No. 16/460,241, filed on Jul. 2, 2019, and entitled "COMPUTING SYSTEM THAT GENERATES A PREDICTED ROUTINE OF A USER", the entirety of which is incorporated herein by reference.

BACKGROUND

Lives of people are typically filled with routine. For example, a person will tend to do similar activities during similar times of the day, week, or month. For instance, on weekdays a person may commute to work or school and then return home; the person may take a child to daycare and thereafter pick the child up from daycare; on certain days the person may go to a class or to the gym, while on weekends the person may visit locations with family and friends such as parks, events, or venues.

Computing systems have been developed that are configured to receive input from a person as to recurring events in the life of the person. For instance, a conventional computing system can receive input from the person that indicates that the person typically leaves a work location at a certain time every workday. Hence, the computing system can provide a reminder to the person as to when the person is to leave the work location and can additionally provide information as to traffic conditions at the time the person is expected to leave the work location.

The conventional computing system may also be configured to provide a location-based recommendation to a person as a function of a current location of the person. For example, when the computing system receives an indication that the person is at a grocery store, the computing system can be configured to output a recommendation that the person next visit a coffee shop that is in geographic proximity to the grocery store. In this example, the computing system does not predict that the person will go to the coffee shop, but instead recommends that the person visit the coffee shop due to the known current location of the person.

Conventionally, predicting a routine of a person is a difficult task due at least partially to noise that exists in location data reported by mobile computing devices. For example, a mobile computing device does not report its location to a server computing device with any defined frequency; instead, an operating system of the mobile computing device controls when location data is reported to a server computing device that is in network communication with the mobile computing device. In an example, when the mobile computing device is in a power saving mode, the mobile computing device will not report its geographic location. Even when the mobile computing device is not in a power saving mode, the mobile computing device may only report its location upon detecting that the mobile computing device has moved a threshold distance from a most recently reported location. Mobile computing devices do not report their locations at set frequencies in order to conserve battery power that is consumed when transmitting data over network connections. Still further, there is currently a lack of computer-implemented models that allow for routines of people to be accurately predicted.

SUMMARY

The following is a brief summary of subject matter that is described in greater detail herein. This summary is not intended to be limiting as to the scope of the claims.

Described herein are various technologies pertaining to a computing system that is configured to predict a routine of a user of a mobile computing device, wherein the routine of the user includes places that are predicted to be visited by the user during several future time intervals of predefined length (e.g., 30 minutes) over a time window (e.g., one week, one month, etc.). The computing system described herein is configured to receive location entries (collectively referred to as location data) reported by the mobile computing device of the person, wherein a location entry includes a latitude/longitude pair and a timestamp, and further wherein the timestamp indicates when the latitude/longitude pair was generated by the mobile computing device. Location entries are collected over some period of time, such as a week or a month, and are anonymized. Accordingly, if a malicious entity were to acquire the location data, the malicious entity would be unable to ascertain an identity of the person or geographic traces of the person.

The computing system can optionally be configured to "clean" the location data to remove location entries therefrom that have ambiguity associated therewith and/or to remove location entries that are anomalous. For instance, when a location entry includes a latitude/longitude pair that is over some threshold geographic distance from any other location entry, such location entry may be removed from the location data. This situation can occur when, for example, the mobile computing device is powered off or enters low power mode and accordingly fails to report location entries. In another example, when an amount of time between a location entry and any other location entry is greater than a predefined amount of time, the location entry can be removed from the location data. In another exemplary embodiment, such location entries can be retained and subjected to clustering, as described below.

The location data (optionally after being "cleaned") can be processed to identify visits of the user, wherein a visit is when the user is at a place (e.g., a business, home, work, a home of a friend, etc.) for at least some threshold amount of time (e.g., 10 minutes). To identify visits, the computing system clusters location entries as a function of time and space to form location clusters, such that location entries that are both temporally and geographically proximate to one another are clustered together in a location cluster, while location entries that are not proximate to one another in space are placed in different location clusters. In addition, the computing system can parameterize the clustering algorithm with suitable parameters to prevent the clustering algorithm from forming a location cluster that includes location entries that are more than some threshold geographic distance from one another (e.g., 100 meters). The computing system can then filter location clusters based upon location entries that are included in the location clusters. For instance, the computing system can filter a location cluster from the location clusters when an amount of time between an earliest timestamp and a latest timestamp of location entries in the location cluster is less than ten minutes. For example, a location cluster of location entries may correspond to when the person is sitting in traffic at an intersection; the computing system can filter such location cluster, as the person is not intending to visit a location when stuck in traffic.

For remaining location clusters, the computing system can map such clusters to an identity of a place, wherein the identity of the place can be a name of the place (e.g., "business A") or a category of the place (e.g., "grocery"). For instance, the computing system can compute median latitude and longitude values for location entries in a location cluster and can map the median latitude and longitude values to a place through use of any suitable reverse geocoding service. The computing system can then assign an identity of the place to the location cluster. Thus, the computing system can assign a category "gym" to the location cluster when a place that corresponds to the location cluster is a gym. Based upon the location clusters and identities of places assigned to the location clusters, the computing system can generate visit entries that are representative of visits of the person over time, wherein each visit entry includes: 1) a date when the visit started; 2) an identity of a place that the user visited; and 3) a duration of the visit.

The computing system, based upon the visit entries, can assign labels to time intervals of predefined length over some predefined historic window of time, wherein the labels are indicative of identities of places that the user visited in the past. For example, the predefined length of the time intervals may be 30 minutes, and the window of time may be two weeks, such that 672 time intervals are assigned labels. For time intervals where more than one place was visited by the person (as evidenced by the visit entries), the computing system can determine which place was visited longest in the time interval from amongst all places that can be mapped to the time interval, and can assign a label to the time interval that is indicative of the identity of the determined place. In addition, the computing system can assign the label "unknown" to time intervals that have no visits corresponding thereto. Hence, in this example, a sequence of 672 labels is generated, with each label corresponding to a time interval of 30 minutes.

The computing system processes the sequence of labels and outputs a predicted routine of the user based upon such sequence of labels. In an exemplary embodiment, the computing system can employ a frequent itemset mining algorithm to output the predicted routine of the person. In such embodiment, the computing system assigns item labels to each time interval in the sequence of time intervals. An item label may be temporally-related, such "8 AM", "morning", "weekday", etc. In another example, an item label may be spatially-related, such that the item label can indicate a category corresponding to a place visited by the person, a name of a business corresponding to the place, and so forth. The computing system can then use a frequent itemset mining algorithm to identify frequently co-occurring item labels (using statistical thresholds), and output rule patterns based upon the frequently co-occurring item labels. The computing system can employ the rule patterns to generate a predicted routine of the user. Hence, using this approach, the computing system can output a predicted routine that indicates that on weekdays at 9:30 a.m. during the next week the user is likely to be at work.

In another exemplary embodiment, a sequence to sequence model can be employed to output a predicted routine of the user based upon the sequence of labels described above. For example, the sequence to sequence model can include an encoder and a decoder, each of which includes a plurality of recurrent neural networks (RNNs). The output of the sequence to sequence model is a sequence of labels assigned to future time intervals of predefined length over a predefined future window of time, wherein the labels are indicative of identities of places that the user is predicted to visit during such future time intervals. In yet another exemplary embodiment, the computing system can employ a convolutional network to output a predicted routine of the user, wherein the convolutional network is a masked time-dilated convolutional network (MTCN). In this exemplary embodiment, the MTCN receives the sequence of labels and outputs a sequence of labels that correspond to future time intervals of predefined length over a predefined future window of time, wherein the labels are indicative of identities of places that the user is predicted to visit during such future time intervals. The MTCN exhibits some advantages over the RNN-based sequence to sequence model referenced above, namely that the computing system outputting the predicted routine of the user through use of the MTCN is able to consider a longer sequence of labels compared to when the computing system uses the sequence to sequence model to output the predicted routine of the user.

Once the computing system has output the predicted routine of the user, the computing system can transmit notifications and/or recommendations to a computing device of the user and/or can perform some other computer-based action. For instance, the computing system can transmit a recommendation for the user to leave a current location at a certain time in order for the user to reach a place where the user is predicted to visit at the time that the user is predicted to visit the place in the predicted routine. In another example, the computing system can transmit a recommendation to the user as to a place for the user to visit based upon a place that is included in the predicted routine. This recommendation can allow the user to perform some planning and decide whether the place is desirable to visit. In yet another example, the computing system can generate an electronic calendar entry based upon the predicted routine, can automatically generate a reservation request based upon the predicted routine, etc. Still further, the computing system can perform analytics based upon predicted routines of numerous users. Resultant analytic information can be useful to city planners, for example, when planning on where to position bus stops, where to zone for certain types of businesses, and so forth.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
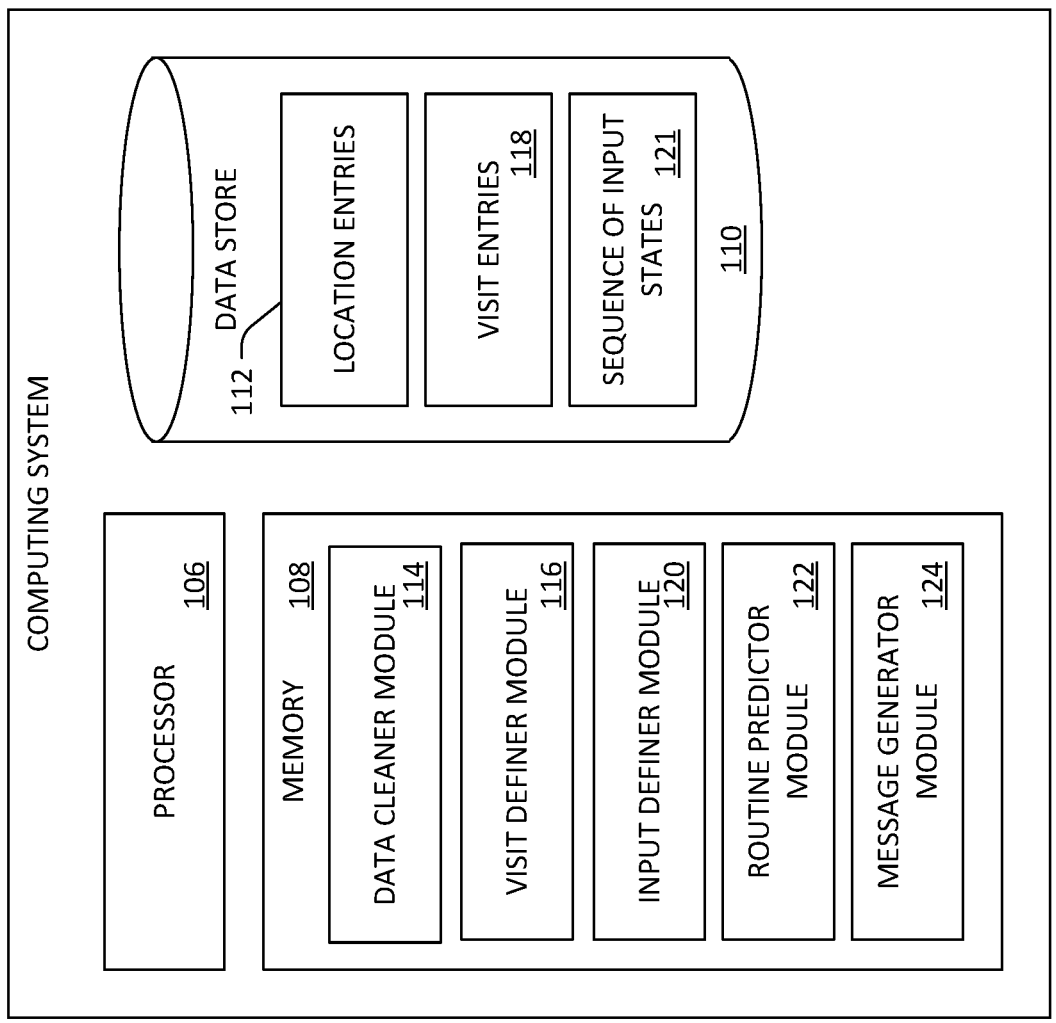
FIG. 1 is a schematic of an exemplary system that is configured to predict routines of people.
Figure 1:
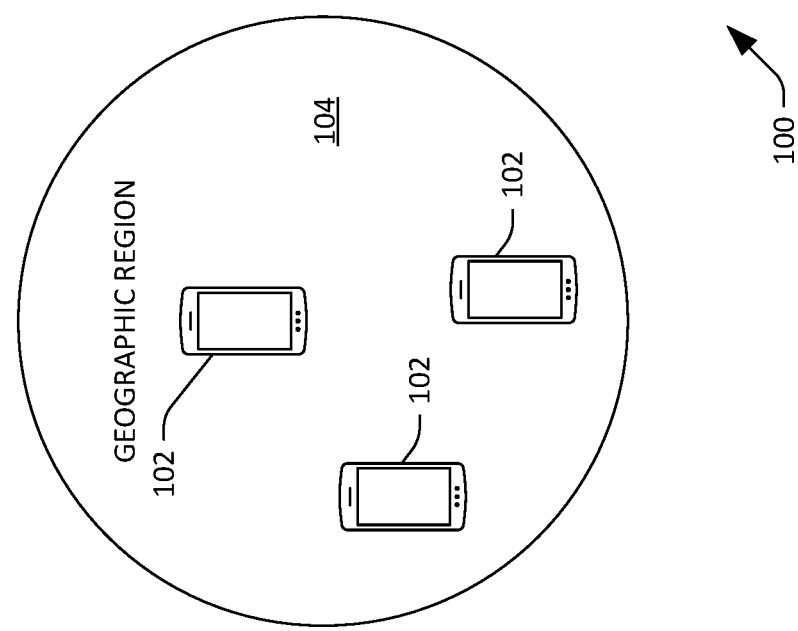

Various technologies pertaining to predicting routines of users of mobile computing devices are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something and is not intended to indicate a preference.

Described herein are various technologies pertaining to predicting routines of users of mobile computing devices based upon location entries generated by the mobile computing devices of the users. As will be described in greater detail herein, a mobile computing device of a user generates several location entries over time, wherein each location entry includes: 1) latitude/longitude pair; and 2) a timestamp that is indicative of a time that the mobile computing device generated the latitude/longitude pair. A computing system receives location entries from the mobile computing device and processes the location entries to generate visit entries, wherein a visit entry is representative of a visit of the user. A visit entry includes: 1) an identity of a place, wherein the identity of the place can be a name of the place or a category of the place; 2) a date when the visit started; 3) a time when the visit started; and 4) a duration of the visit. The duration of each visit, in an example, is above a predefined threshold (such as 10 minutes). A sequence of states is generated based upon the visit entries, wherein each state comprises an identity of a place, and further wherein each state corresponds to a past time interval of a predefined length (e.g., 30 minutes). The computing system is configured to generate a predicted routine of the user over some predefined amount of time into the future (e.g., a next half hour, one day, one week), wherein the predicted routine includes a sequence of states that comprise identities of places that the user is predicted to visit over a future window of time, wherein each state corresponds to a predefined length of time (e.g., 30 minutes). The computing system can then transmit an electronic message to the mobile computing device of the user based upon the predicted routine, wherein the electronic message can be a notification for the user, a recommendation for the user, or the like.

With reference now to FIG. 1, a schematic of an exemplary computing system 100 that is configured to predict a routine of a user of a mobile computing device is illustrated. A routine is a sequence of places visited by the user over some predefined amount of time, such as two weeks or a month; accordingly, a predicted routine is a sequence of places that the user is predicted to visit over the predefined amount of time. As will be described in greater detail below, the predicted routine output by the computing system 100 can be a sequence of labels that identify places, wherein each label is assigned to a time interval of predefined length. Hence, in an example, the predicted routine may cover a future one-week window of time, and the computing system 100 can assign a label to each 30-minute interval in the one-week window of time. This is in contrast to conventional approaches, wherein such conventional approaches include generation of recommendations to a user based upon current location of the user (and observed actions of other users) and/or include generation of messages based upon explicit input provided by a user as to a future location of the user.

The computing system 100 is in network communication with a mobile computing device 102 of the user, wherein the mobile computing device 102 is carried by the user as the user moves about a geographic region 104. For example, the mobile computing device 102 can be a mobile telephone, a wearable computing device (e.g., a watch or a head-mounted computing device), a tablet computing device, etc.). As the mobile computing device 102 moves in the geographic region 104, the mobile computing device 102 generates location entries and transmits the location entries to the computing system 100.

The mobile computing device 102 generates and transmits the location entries based upon instructions executed by a processor of the mobile computing device 102. To conserve energy of a battery of the mobile computing device 102, the mobile computing device 102 fails to transmit location entries to the computing system 100 at a predefined frequency. Instead, the mobile computing device 102 is configured with logic such that the mobile computing device 102, from time to time, generates a location entry and transmits the location entry to the computing system 100. A location entry comprises: 1) a latitude/longitude pair; and 2) a timestamp that identifies when the mobile computing device 102 generated the latitude/longitude pair. The mobile computing device 102, for example, includes a Global Positioning System (GPS) sensor that generates latitude/ longitude pairs. In an exemplary embodiment, to conserve energy of a battery of the mobile computing device 102 and/or to conserve an amount of data transmitted over a network connection, the mobile computing device 102 may only transmit a location entry to the computing system 100 when the mobile computing device 102 has moved some threshold distance from a location from which the mobile computing device 102 most recently transmitted a location entry to the computing system 100 (e.g., the mobile computing device 102 must move by some predefined distance before the mobile computing device 102 will transmit a location entry to the computing system 100). In another example, the mobile computing device 102 may transmit a location entry to the computing system 100 only after a predefined amount of time has passed since the mobile computing device 102 most recently transmitted a location entry to the computing system 100. Additionally, the mobile computing device 102 may not transmit a location entry when the mobile computing device 102 is in a low-power state, when the mobile computing device 102 is unable to generate a location entry with sufficient accuracy, when the mobile computing device 102 is powered off, etc. It can be ascertained, however, that the mobile computing device 102 transmits several location entries over time to the computing system 100, such that the computing system 100 receives a time-ordered sequence of location entries generated by the mobile computing device 102.

The computing system 100 includes a processor 106 and memory 108 that includes instructions that are executed by the processor 106. The computing system 100 additionally includes a data store 110 that comprises location entries 112 that have been transmitted to the computing system 100 by the mobile computing device 102 as the mobile computing device 102 moved about the geographic region 104.

The memory 108 optionally includes a data cleaner module 114 that is configured to "clean" the location entries 112 transmitted to the computing system 100 by the mobile computing device 102. For example, the data cleaner module 114 can be configured to remove entries from the location entries 112 that are somehow inconsistent with other entries in the location entries 112, that are inconsistent with location information explicitly provided by the user (e.g., as indicated in a meeting in a calendar application), that are some threshold distance from any other entry in the location entries 112, etc. It is noted that data cleaning is optional, and in another exemplary embodiment the location entries 112 can be subjected to clustering (as described in greater detail below) without being subjected to "cleaning". The location entries 112 can have an anonymized user identifier associated therewith; accordingly, if a malicious entity were to acquire the location entries 112 from the data store 110, the malicious entity would be unable to ascertain an identity of the user to which the location entries 112 correspond.

The memory 108 also includes a visit definer module 116 that is configured to identify visits of the user based upon the location entries 112 (after the data cleaner module 114 has cleaned the location entries 112). The visit definer module 116 can identify a visit by ascertaining, based upon the location entries 112, that the user was at a place for at least a threshold amount of time (e.g., at least 10 minutes). Accordingly, based upon the location entries 112, the visit definer module 116 generates visit entries 118, wherein each visit entry can include: 1) an anonymized user identifier; 2) an identifier for a place of the visit occurred (where the identifier for the place can be a name of the place or a category of the place); 3) a date when the visit started; 4) a time when the visit started; and 5) a duration of the visit (e.g., an amount of time that the person was at the place). Accordingly, the visit entries 118 represent a sequence of visits of the user of the mobile computing device 102 over some window of time (e.g., one month, two months, etc.).

The memory 108 also includes an input definer module 120 that is configured to generate a sequence of input states 121 based upon the visit entries 118, wherein each state in the sequence of input states 121 includes either an identifier of a respective place visited by the user during a time interval over the window of time or an "unknown" label for the time interval. More specifically, the input definer module 120 can define a time interval of a predefined length, such as 30 minutes. The input definer module 120 can assign an identifier or a place or an "unknown" label to each time interval of the predefined length over a defined time range, such as two weeks, one month, two months, or the like, wherein the input definer module 120 assigns the identifiers to the time intervals based upon the visit entries 118. Accordingly, and in an example, a visit entry in the visit entries 118 may indicate that the person was at place "A" between 10:40 AM and 11:40 AM on date "B". Based upon this visit entry, and with the predefined time interval being 30 minutes, the input definer module 120 can assign an identifier for place "A" to the time interval that corresponds to 10:30 AM-11:00 AM on date "B". Similarly, the input definer module 120 can assign an identifier for place "A" to the time interval that corresponds to 11:00 AM-11:30 AM on date "B". When the visit entries 118 indicate that, for a particular time interval, the user had visits to multiple places, the input definer module 120 can assign an identifier of a place to the particular time interval that the user was visiting longest within the particular time interval from amongst all places visited by the user during the particular time interval. The input definer module 120 can assign a label of "unknown" to time intervals that have no corresponding visit entry in the visit entries 118. Accordingly, output of the input definer module 120 is the sequence of states 121, with each state including an identifier of a place visited by the user during a time interval of predefined length or an "unknown" label, and wherein the sequence of states 121 corresponds to a predefined time range (e.g., two weeks, one month, etc.).

The computing system 100 additionally includes a routine predictor module 122 that is configured to receive the sequence of states 121 output by the input definer module 120 and is further configured to generate a predicted routine of the user based upon such sequence of states 121. The predicted routine of the user may have a form that is similar to the form of the sequence of states 121 that is provided as input to the routine predictor module 122. For example, the routine predictor module 122 can generate an output sequence of states, wherein each state includes an identifier of a respective place that the user is predicted to visit, wherein each state corresponds to a future time interval of a predefined length, and further wherein the output sequence of states covers a future window of time of predefined length (e.g., the next week, the next two weeks, the next month, etc.). In another example, each state can include one or more place identifiers, and can further include confidence values that are indicative of probabilities that the user will visit one or more places identified by the one or more place identifiers. For instance, a state corresponding to a future interval of time may include place identifiers "restaurant" and "gym", as well as a score of 0.9 for the place identifier "restaurant" and a score of 0.1 for "gym". It is further to be understood that the time interval that corresponds to the input states received by the routine predictor module 122 need not be the same as the time interval that corresponds to the output states.

Figure 2:
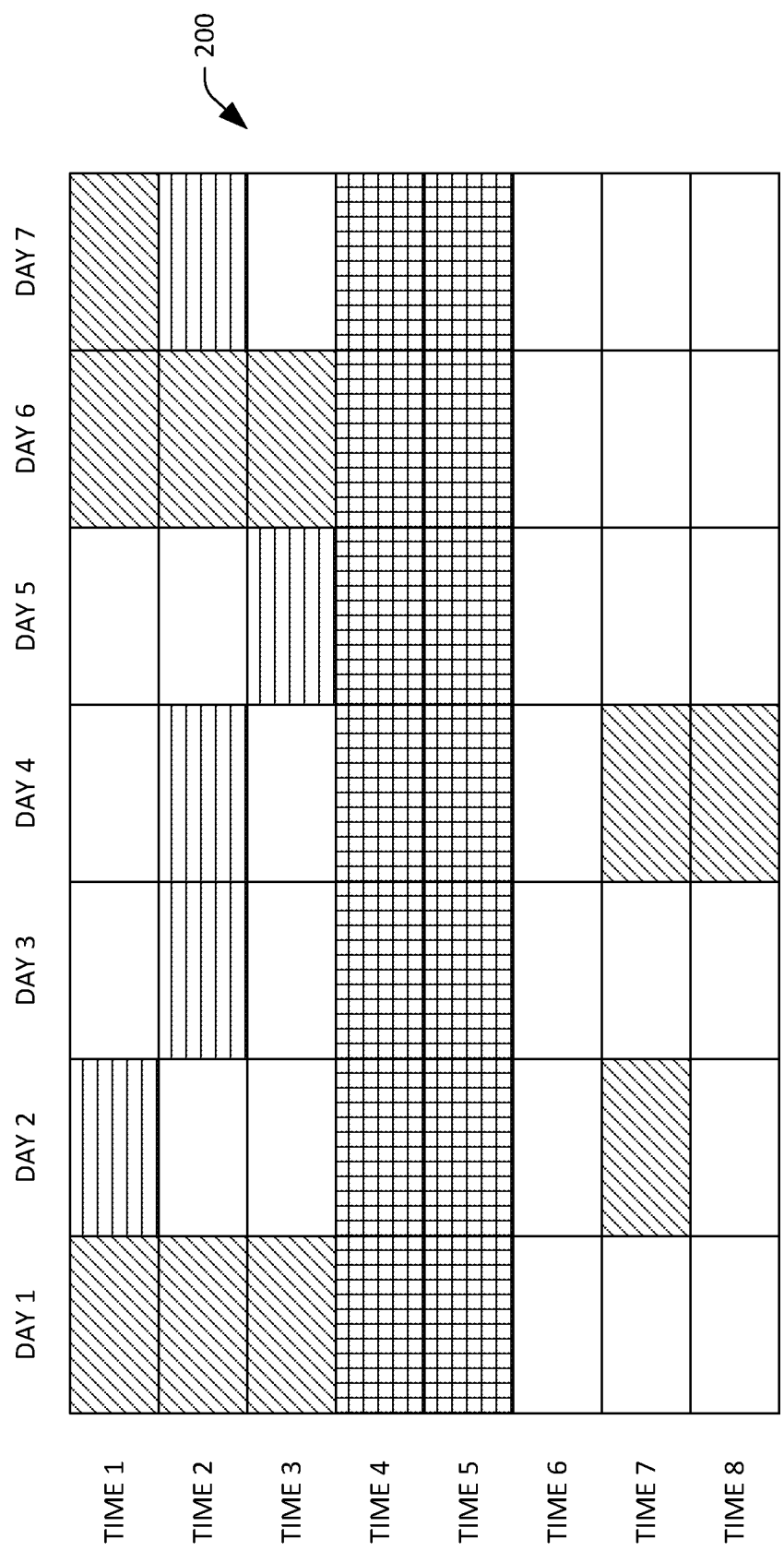
FIG. 2 is a schematic that illustrates an exemplary routine of a user.

Referring briefly to FIG. 2, an exemplary predicted routine 200 of a user generated by the routine predictor module 122 is illustrated. The exemplary predicted routine 200 includes, for each three-hour interval over the next week, places that the user is predicted visit. For instance, on day one at time intervals one, two, and three, the predicted routine 200 illustrates that the predictor module 122 has predicted that the user will be at a first place. In contrast, on day one at times four and five, the predicted routine 200 illustrates that the routine predictor module 122 has predicted that the user will be at a second place. Further, the predicted routine 200 illustrates that the routine predictor module 122 has predicted places that the user will visit several days in advance. Hence, the predicted routine 200 illustrates that the routine predictor model 122 has predicted that the user will be visiting the first place during time intervals one, two, and three of day six, and has predicted that the user will be visiting the second location during time intervals four and five of day six. While the time intervals illustrated in the predicted routine 200 are shown as being three hours, it is emphasized that the time intervals may be smaller or larger. For instance, the time intervals may be 5 minutes, 10 minutes, 15 minutes, 30 minutes, etc. In another example, the time intervals may be days (e.g., the routine protector module 122 may predict a day in a year that the user will be on vacation).

Returning to FIG. 1, the memory 108 also includes a message generator module 124 that is configured to generate an electronic message and cause the computing system 100 to transmit the electronic message to the mobile computing device 102 of the user (or some other computing device of the user). In an example, the electronic message may be a notification that is to be provided to the user, wherein such notification can be, for instance, a notification for the user to leave his or her current location to reach a place that the user is predicted to visit at a time when the user is predicted to visit the place. For example, when the predicted routine generated by the routine predictor module 122 indicates that the user is predicted to pick up his or her child from a daycare center at 5:30 PM, and traffic conditions are such that it will take 15 minutes to reach the daycare center, the message generator module 124 can generate an electronic notification that notifies the user to leave by 5:15 PM to reach the daycare center by 5:30 PM. In another example, the message generator module 124 can generate a recommendation for the user based upon the predicted routine generated by the routine predictor module 122. For instance, when the predicted routine indicates that the user is predicted to be at a grocery store at 6:30 PM three days from a current day, the message generator module 124 can generate a message that recommends that the user purchase an item at the grocery store based upon a sale that is occurring on the item on the day that the user is predicted to visit the grocery store. In another example, the message generator module 124 can generate a recommendation for the user to visit another place that is geographically proximate to a place that the user is predicted to visit, such that the user is able to plan whether or not to travel to the recommended place.

Exemplary operation of the computing system 100 is now set forth. As described previously, the mobile computing device 102 generates location entries over time and transmits the location entries 112 to the computing system 100. The computing system 100 stores the location entries 112 in the data store 110, wherein each location entry includes 1) a latitude/longitude pair; 2) a timestamp; and 3) an anonymized user identifier. The data cleaner module 114 "cleans" the location entries 112, wherein cleaning the location entries 112 can include removing each location entry that is not within some threshold time or distance from any other location entry in the location entries 112. In addition, the data cleaner module 114 can remove location entries from the location entries 112 that are stale. For instance, the data cleaner module 114 can remove location entries from the location entries 112 that are more than six months old. In another example, the data cleaner module 114 can remove location entries from the location entries 112 that are more than three months old.

Figure 3:
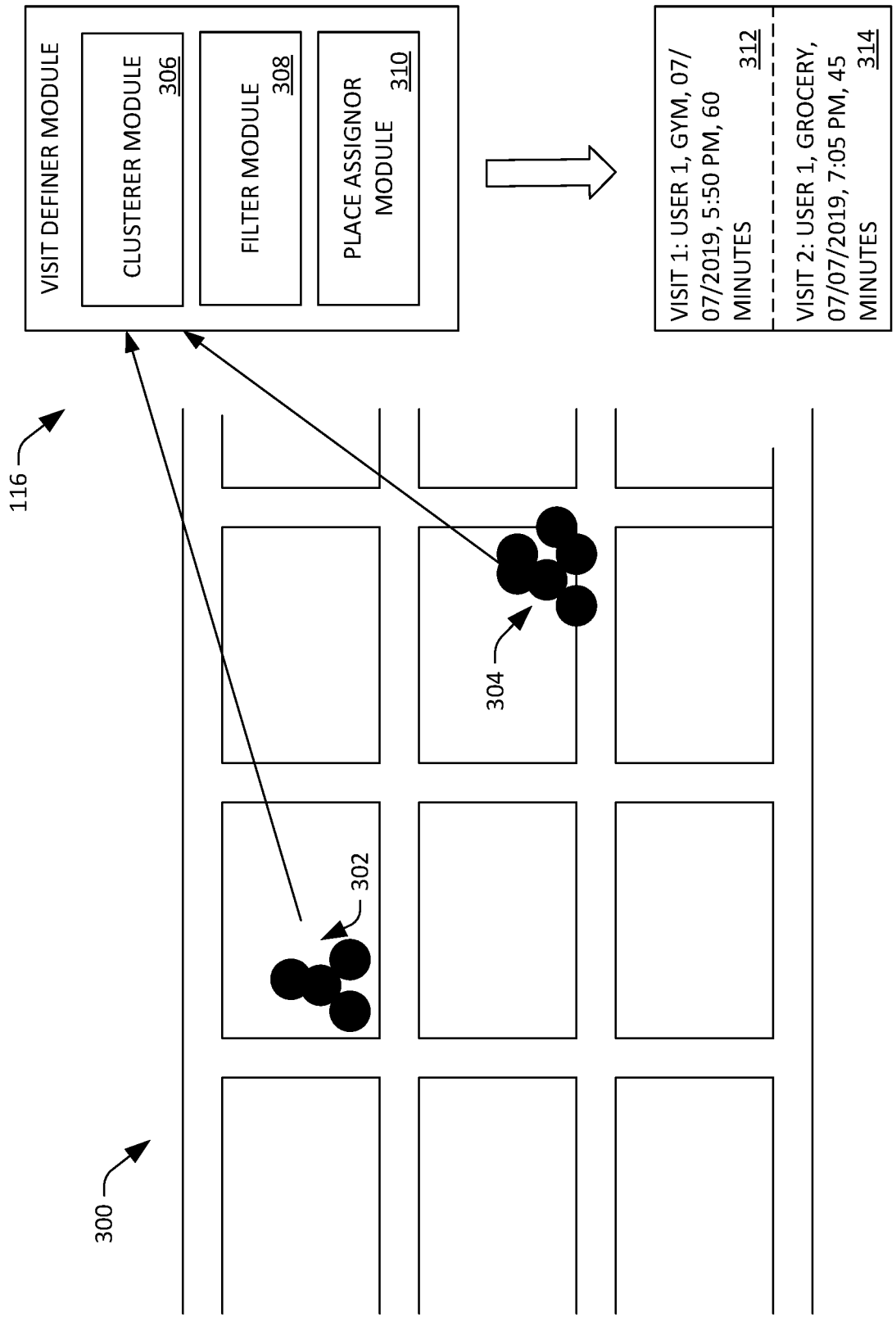
FIG. 3 is a schematic that illustrates a module that is configured to identify a visit of a user.

Once the data cleaner module 114 has cleaned the location entries 112, the visit definer module 116 can identify visits of the user and generate visit entries 118 based upon the identified visits. With reference now to FIG. 3, a schematic that depicts operation of the visit definer module 116 is illustrated. As shown in FIG. 3, location entries in the location entries 112 are illustrated with respect to a geographic region 300. As can be ascertained, a first set of location entries 302 corresponds to a first place while a second set of location entries 304 corresponds to a second place. The visit definer module 116 includes a clusterer module 306 that clusters location entries. The clusterer module 306 can utilize any suitable clustering algorithm to cluster the location entries 112, wherein the clusterer module 306 takes into account both geo-spatial and temporal closeness of location entries when clustering the location entries 112. Accordingly, the clusterer module 306 outputs location clusters, which are dense clusters of location entries generated by the mobile computing device 102. An exemplary clustering algorithm that can be employed by the clusterer module 306 is time-augmented DBSCAN, although other suitable clustering algorithms are contemplated.

The visit definer module 116 additionally includes a filter module 308 that can remove location clusters from the location clusters output by the clusterer module 306, wherein the filter module 308 removes the location clusters based upon predefined filtering criteria. For example, the filter module 308 can remove clusters that consist of a single location entry. In another example, the filter module 308 can remove clusters having location entries that do not span a predefined length of time (e.g., a difference between an earliest timestamp and a latest timestamp in the location clusters is less than the predefined length of time, such as ten minutes). Hence, in an example, location clusters that correspond to stops at traffic intersections may be removed from the location clusters.

The visit definer module 116 also includes a place assignor module 310 that can assign an identifier for a place that spatially corresponds to the location cluster. For instance, the place assignor module 310 can include or have access to a reverse geocoding service, wherein the reverse geocoding service can receive a latitude/longitude pair and output an identity of a place that spatially corresponds to such latitude/longitude pair. The place assignor module 310 can utilize any suitable technique to ascertain a latitude/longitude pair to provide to the reverse geocoding service. For instance, the place assignor module 310 can compute mean or median latitude and longitude values based upon latitude/longitude pairs in a location cluster and provide a mean/median latitude value and a mean/median longitude value to the reverse geocoding service. The reverse geocoding service, based upon the latitude/longitude pair, can return an identity of a place (if any) that corresponds to the latitude/longitude pair. In another example, the place assignor module 310 can provide each latitude/longitude pair of each location entry in a location cluster to the reverse geocoding service, and the reverse geocoding service can output an identity of a place (if any) for each received latitude/longitude pair. The place assignor module 310 can then select the place identity that is assigned to the most latitude/longitude pairs by the reverse geocoding service.

The visit definer module 116 generates the visit entries 118 based upon the location clusters output by the clusterer module 306 (e.g., the clusters not filtered by the filter module 308) and the place identifiers assigned to the clusters by the place assignor module 310. More specifically, the visit definer module 116 can create visit entries that correspond to such clusters, wherein each visit entry includes: 1) an anonymized user identifier; 2) an identifier of a place ascertained for the location cluster by the place assignor module 310; 3) a date when the visit started (as indicated by the earliest timestamp in the location cluster); 4) a time when the visit started (as indicated by the earliest timestamp in the location cluster); and 5) a duration of the visit (e.g., a difference between the earliest timestamp and latest timestamp in the location cluster). In the example shown in FIG. 3, the clusterer module 306 has created two location clusters that correspond to the sets of location entries 302 and 304. The visit definer module 116 generates two visit entries 312 and 314 based upon such location clusters, wherein each visit entry includes the data noted above.

Figure 4:
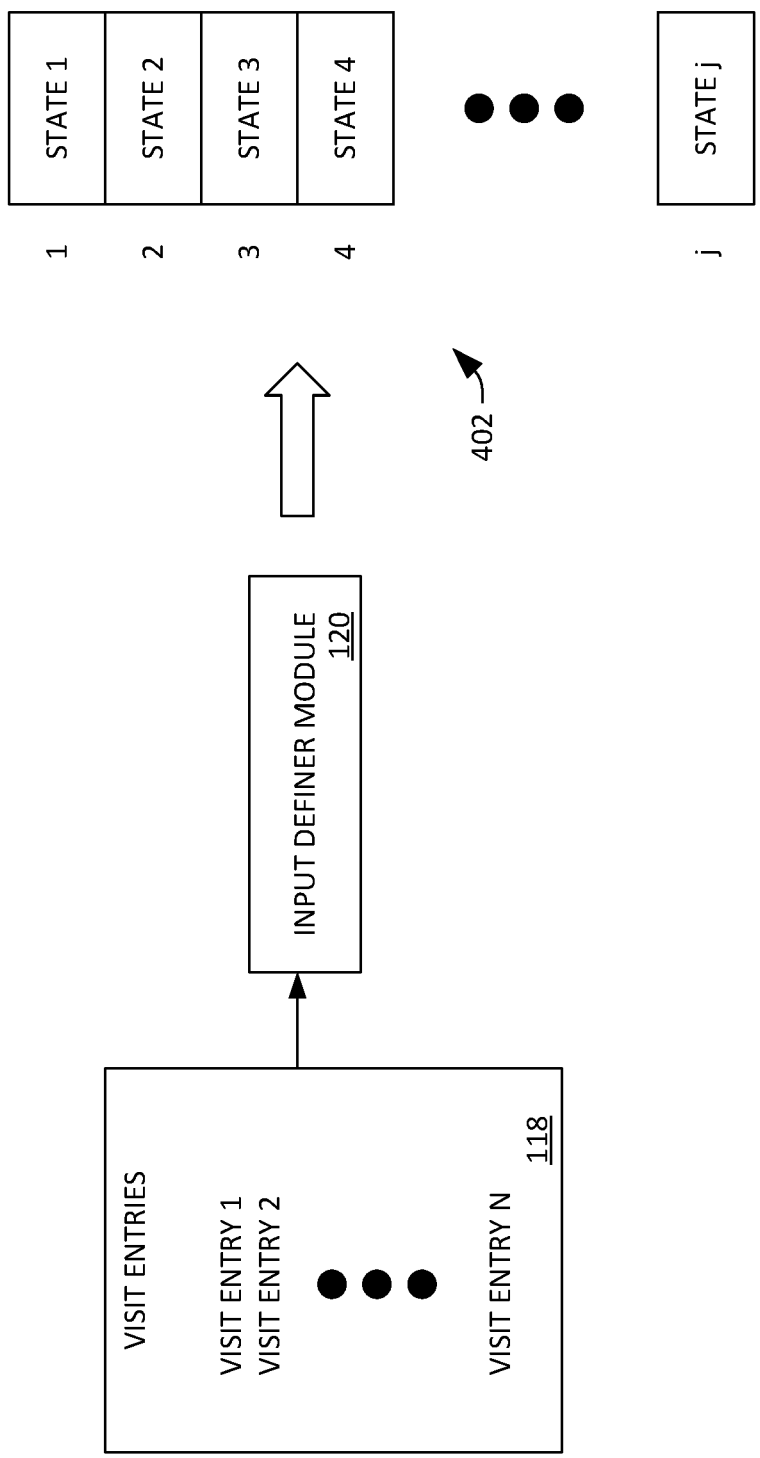
FIG. 4 is a schematic that illustrates a module that is configured to generate a sequence of labels that are indicative of identities and/or categories of places, where each label is assigned to an interval of time of predefined length.

Now referring to FIG. 4, a schematic illustrating operation of the input definer module 120 is depicted. The input definer module 120 receives the visit entries 118, wherein each visit in the visit entries 118 occurred within some predefined past window of time (e.g., the last three months, the last month, etc.). The input definer module 120 generates a sequence of input states 402, wherein each state corresponds to a respective interval of time, and further wherein each interval of time is of a predefined length. As illustrated in FIG. 4, an exemplary sequence of input states includes j states that correspond to j intervals of time of predefined length over some past window of time (e.g., the last month). Thus, the input definer module 120 transforms the visit entries 118 into an input sequence i with states $\{x_i, =(C_{i_j}, w_{i_j})\}_{j=1}^n$, where $C_{i_j}$ is the identifier of the place in a visit entry for the jth interval, and $\omega_{i_j}=(u_i, t_{i_j}, \ldots)$ is a context vector having features capturing the anonymized user identifier and different temporal aspects associated with the jth interval, such as: day of month, day of week, business day, weekend, time of day, etc. As referenced previously, there may be one or more intervals that do not temporally correspond to a visit entry. For input states that correspond to such intervals, the input definer module 120 can set CL, as "unknown", such that the sequence of input states 402 includes one or more states with "unknown" labels. In addition, with respect to a state that temporally corresponds to an interval of time where two or more separate visits correspond to such interval of time, the input definer module 120 can assign a place identifier to such state by identifying a visit entry that corresponds to more of the time interval than any other visit entry, and thereafter assign a place identifier to the state based upon the identified visit entry.

Figure 5:
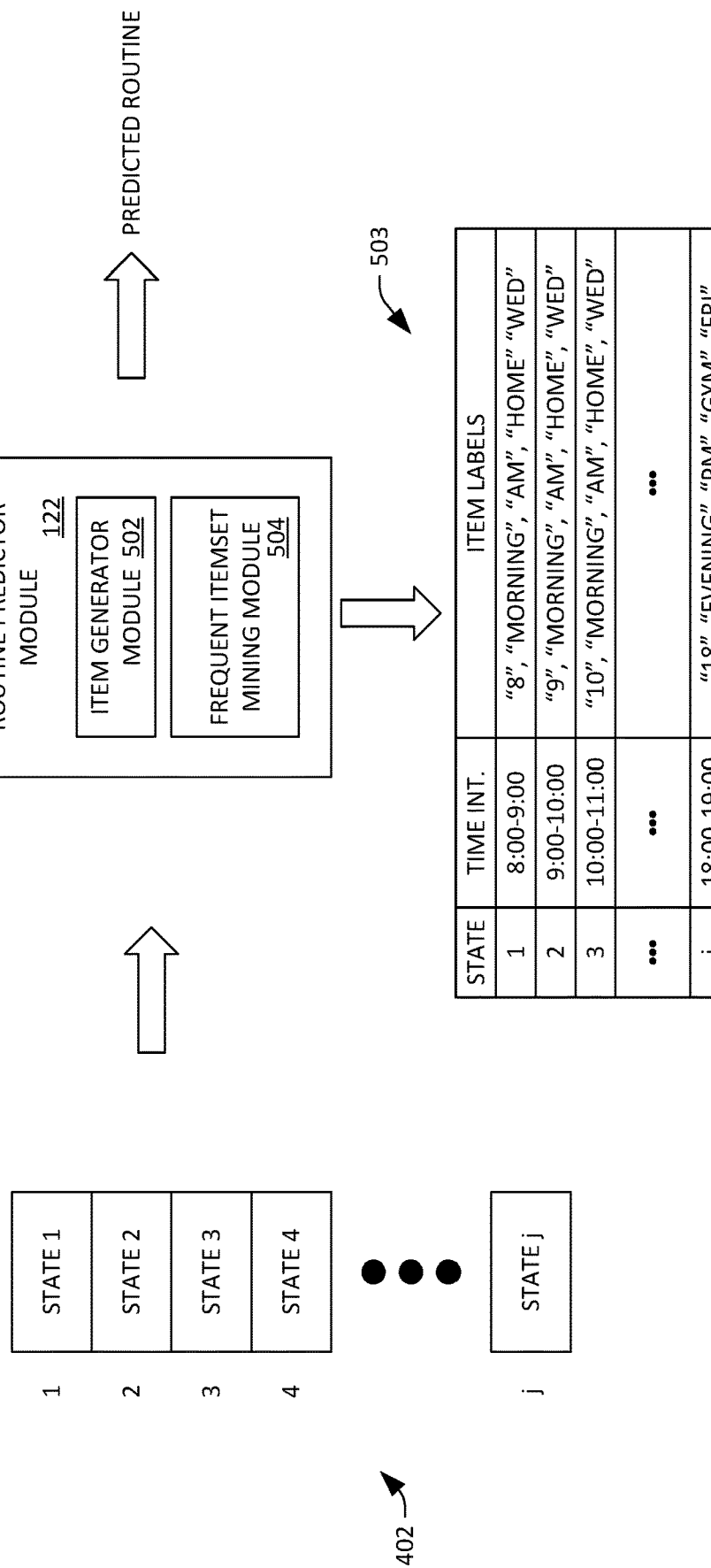
FIG. 5 is a schematic that illustrates a module that is configured to employ a frequent item set mining algorithm to predict a routine of a user.

Referring now to FIG. 5, a schematic that illustrates exemplary operation of the routine predictor module 122 is illustrated. The routine predictor module 122 receives the sequence of input states 402 output by the input definer module 120 and generates a predicted routine of the user based upon the sequence of input states 402. In an exemplary embodiment, the routine predictor module 122 can employ a frequent itemset mining algorithm in connection with generating the predicted routine of the user. To that end, the routine protector module 122 can include an item generator module 502 that is configured to generate, for each state in the input sequence of states 402, a plurality of item labels. The item labels generated by the item generator module 502 can be temporal, spatial, based upon user interests, etc. For instance, with respect to a state that corresponds to a time interval of 8:00 AM-9:00 AM on a Wednesday when the user is at home, the item generator module 502 can generate item labels "8", "morning", "AM", "home", "Wednesday", "weekday", etc., and can assign such item labels to the state. For another state in the sequence of states 402 that corresponds to the time interval of 5:00 PM-5:30 PM on a Friday, the item generator module 502 can generate item labels "17", "evening", "PM", "gym", "Friday", "weekday", etc. A table 503 depicting exemplary item labels that can be assigned to states in the sequence of states 402 is depicted.

The routine predictor module 122 also includes a frequent itemset mining module 504 that is configured to employ a frequent itemset mining algorithm to identify co-occurring item labels across states. In an exemplary embodiment, the frequent itemset mining algorithm can be an association rule mining (ARM) algorithm. The frequent itemset mining module 504 identifies rule patterns based upon co-occurring item labels in different states. An exemplary rule pattern can be "at 8:00 AM on weekdays the user is at work." The frequent itemset mining module 504 can identify the rule patterns as being rule patterns that have a threshold amount of support, a threshold amount of confidence, and a threshold amount of lift. The routine predictor module 122, based upon the identified rule patterns, can generate the predicted routine of the user. For example, the routine predictor module 122 can generate the predicted routine of the user such that at 8:00 AM on weekdays the user is predicted to be at work. In addition, the routine predictor module 122 can output data that indicates why the routine predictor module 122 has inferred that the user will be at a certain place at a certain time in the future. For instance, the routine predictor module 122 can output an indication that the user in the past has gone to the gym at 5:00 PM on Tuesdays 75% of the time (based upon item labels assigned to the sequence of states 402). Accordingly, the user can intuit why the routine predictor module 122 has output a notification to the user pertaining to the predicted visit to the gym.

Figure 6:
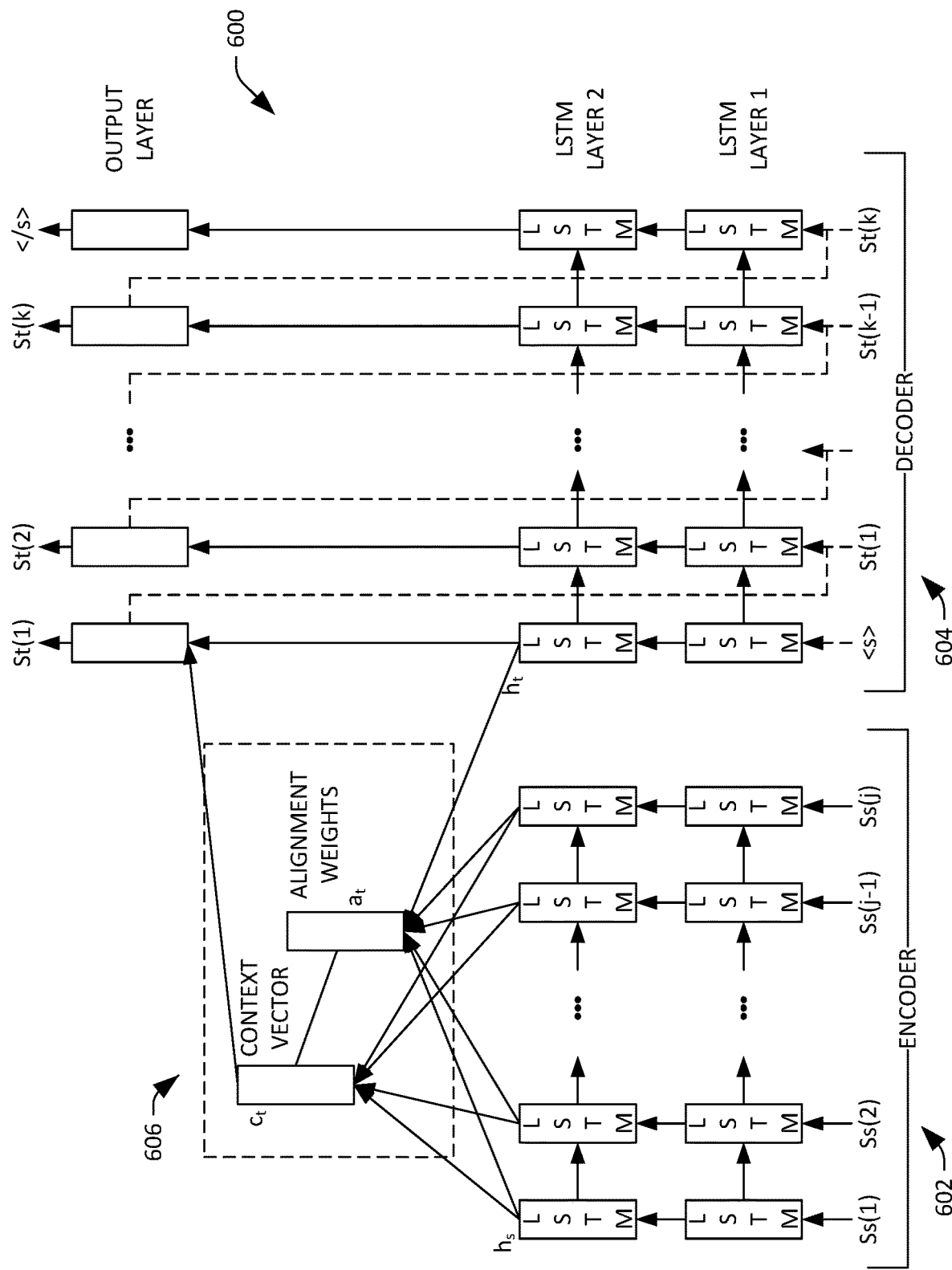
FIG. 6 is a schematic that illustrates an exemplary sequence to sequence model that is employable to predict a routine of a user based upon a sequence of labels that are indicative of identities and/or categories of places visited by a user.

Now referring to FIG. 6, an exemplary sequence to sequence model 600 that can be employed by the routine predictor module 122 to generate predicted routines of users is illustrated. While the frequent itemset mining approach described above is intuitive to end users (e.g., a user can understand why the routine predictor module 122 has predicted that the user will be visiting a place at a time in the future), there are some deficiencies associated with the use of frequent itemset mining. For instance, frequent itemset mining is not well-suited to identify changes in trends; instead, the frequent itemset mining module identifies frequent co-occurrences of item labels that correspond to time intervals in the past, identifies rule patterns, and then uses the rule patterns to predict visits going forward. In addition, frequent itemset mining approaches are not configured to identify conditional dependencies. In an example, the user may go to the gym on Tuesday only when the user did not go to the gym on Monday. The frequent itemset mining module 504 is not configured to identify such conditional dependencies unless the conditions are explicitly represented as items.

Thus, in another exemplary embodiment, the routine predictor module 122 can employ the sequence to sequence model 600 to generate the predicted routine of the user. The exemplary sequence to sequence model 600 comprises an encoder 602 and a decoder 604. The encoder 602 includes a first layer of RNNs (e.g., LSTMs) and a second layer of RNNs, while the decoder 604 also includes a first layer of RNNs and a second layer of RNNs. The sequence to sequence model 600 also includes an attention mechanism 606.

The sequence to sequence model 600 receives the input sequence of states 402 and outputs a sequence of predicted states, wherein the predicted states correspond to future intervals of time of predefined length (over some predefined window of time in the future). Hence, in an example, the sequence to sequence model 600 can receive the input sequence of states 402, where each state in the input sequence of states 402 corresponds to a 30-minute time interval, and further wherein the input sequence of states 402 corresponds to a two-week window. The sequence to sequence model 600 can output a predicted sequence of k states, wherein each of the predicted states corresponds to a 30-minute time interval, and further wherein the predicted sequence of k states collectively corresponds to a future two-week window of time. In the exemplary sequence to sequence model 600, every state corresponds to a location interval and its context. While the sequence to sequence model 600 is illustrated as having a particular architecture, it is to be understood that other sequence to sequence model architectures are contemplated, wherein such architectures are configured to receive a sequence of observed states and output a sequence of predicted states (which can then be mapped to a routine).

Figure 7:
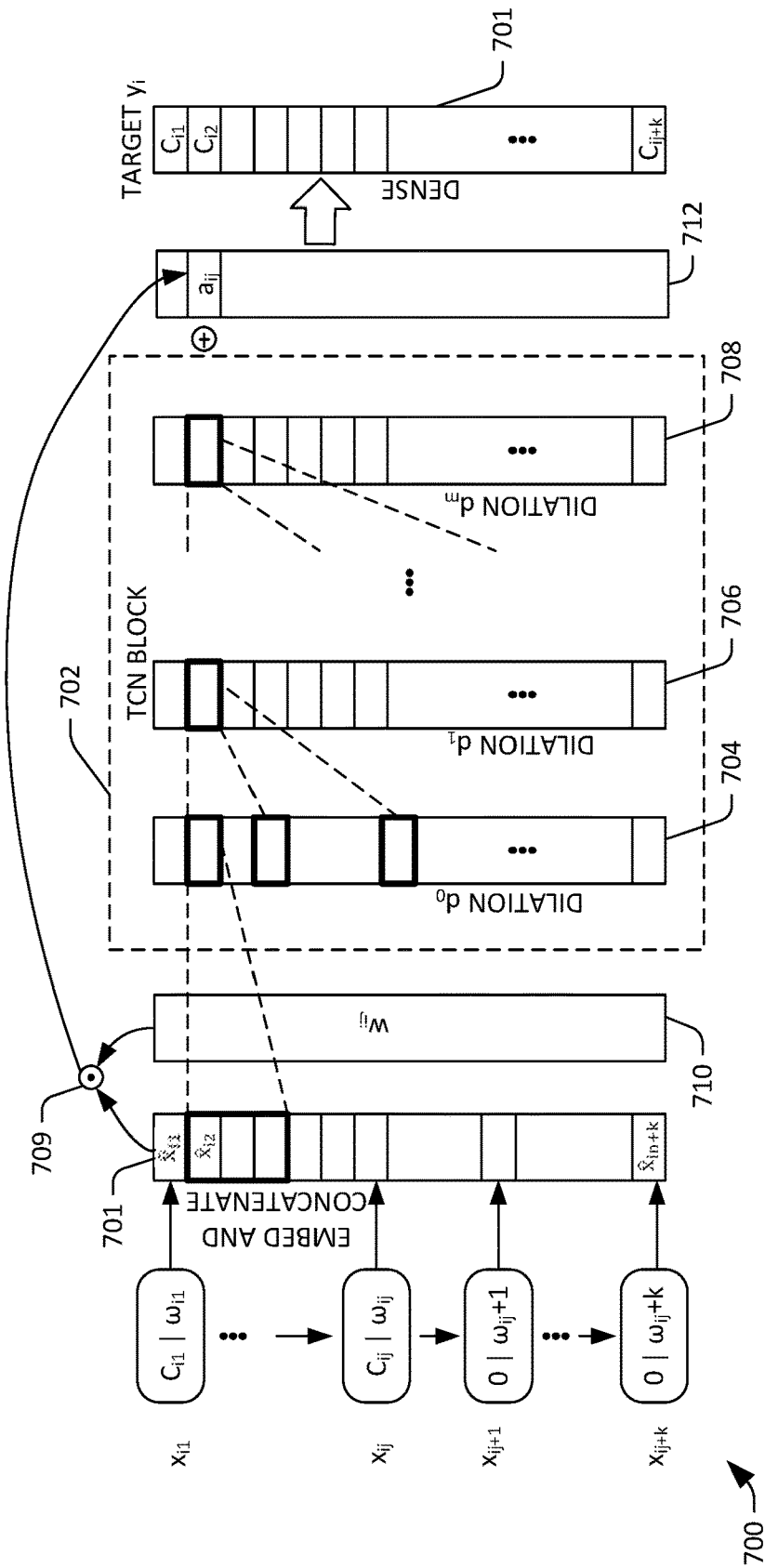
FIG. 7 is a schematic that illustrates an exemplary convolutional network that is employable to predict a routine of a user based upon a sequence of labels that are indicative of identities and/or categories of places visited by a user.

Referring now to FIG. 7, an exemplary convolutional network 700 that can be included in the routine predictor module 122 is illustrated, wherein the routine predictor module 122 utilizes the convolutional network 700 to generate the predicted routine of the user. The convolutional network 700, in an example, can be referred to as a masked time-dilated convolutional network (MTCN). The convolutional network 700 includes custom dilations and masking. The network 700 receives the input sequence of states 402 and embeds the identifier of the place $C_{ij}$ and the context $\omega_{ij}$ to create embedded states $\hat{x}_{ij}$. With respect to the input to the convolutional network 700, the value of $C_{ij+k}$ can be set to zero. The network 700 comprises an embedding layer 701 followed by a time-dilated convolutional network (TCN) block 702, wherein the TCN block 702 comprises several custom dilation layers 704-708. The custom dilation layers 704-706 are applied to the embedded states. The MTCN can also optionally include an attention layer that includes a context vector 710 that follows the embedding layer 701 and alignment weights 712, wherein the attention layer is well-suited to surface input states to which the convolutional network 700 attends.

Dilations are increments in the TCN block 702 (bold rectangles in FIG. 7). Dilations are the reason that the convolutional network 700 is able to handle long input sequences; every dilation layer increases a receptive field in the convolutional network 700 exponentially. In the convolutional network 700, the dilation size and convolution filter lengths are set to capture the expected regularities in user routines. For example, assuming input states correspond to 30 minute time intervals, dilations of size 1, 2, 4, and 8 can be used to detect correlated visits within a few hours, dilations of size 48, 96, and 144 can be used to detect correlated visits at the current time a few days ago (e.g., 2-5 days ago), a dilation size of 336 can be used to detect correlated visits at this time a week ago, etc. It has been observed that custom dilations perform better for routine prediction compared to default power of two dilations.

Masking has recently attracted attention due to significant improvements introduced by the BERT algorithm on a diversity of natural language processing (NLP) tasks. Masking pertains to perturbing a small random sample of the input sequence states 402, thus achieving a form of regularization and avoiding over-fitting. MTCN uses masking and training in the following way: the input has j+k states, combining the j states in the input sequence 402 and the k target states. The targets are the (j+k) place identifiers for these states. In the input sequence 402, the place identifiers $C_{ij}$ for the k last dates are replaced with padding zeroes. Among the rest, some percentage (e.g., 15%) of observed days can be selected, and states corresponding to such days can be masked. The routine predictor module 122 can, for a first percentage (e.g., 80%) of the masked states, replace the place identifier with a zero. For a second percentage (e.g., 10%) of the masked states, the routine predictor module 122 can not change the place identifier. For a third percentage (e.g., 10%) of the masked states, the place identifier is randomly replaced with another place identifier. The loss is a summation of the loss on the target k states plus the loss on the masked states. In scoring, the place identifiers for the observed initial j states are kept unchanged and the target k are padded with zero.

The convolutional network 700 can be trained with two loss functions: 1) default loss—cross-entropy with softmax for every interval xi; in the target and masked days; and 2) custom loss—instead of using equal weights for each interval, the custom loss function associates equal weights with each visit (a visit can span multiple intervals). A problem with the default loss function is that if there is a dominant state the default loss function would prefer it as the safe prediction, e.g., if the user is observed mostly at home then it tends to over-predict the user being at home as the incurred penalty for missing a very short visit is small. The custom loss function focuses on recalling all visits; that is, comparable loss is incurred for mis-predicting both short and long visits.

Experimentally, the convolutional network 700 was identified to perform with greater accuracy than the sequence to sequence model 600 depicted in FIG. 6. It is to be understood, however, that in some implementations, the routine predictor module 122 can utilize two or more of the approaches described herein (frequent itemset mining, sequence to sequence models that include RNNs, and/or convolutional networks). For example, when the convolutional network and the frequent itemset mining approach output consistent results, statistical data generated by the frequent itemset mining module 504 can be surfaced to the user so that the user can readily understand why the computing system 100 predicted that the user would be at a particular location at a certain future point in time.

While the examples set forth above relate to generating a predicted routine for a user, it is to be understood that the technologies described herein can be employed to predict routines of several users, and the predicted routines of the several users can be subjected to analytics algorithms. Accordingly, for instance, the computing system 100 can output an indication that a certain percentage of people are expected to leave for work at a certain time. This information can then be used, for instance, for traffic planning by a governmental body. In another example, the computing system 100 can output an indication that some percentage of people are predicted to go to the gym after work on weekdays; this information can be used by a construction company to ascertain where to build a building that is to be used as a gym.

Figure 8:
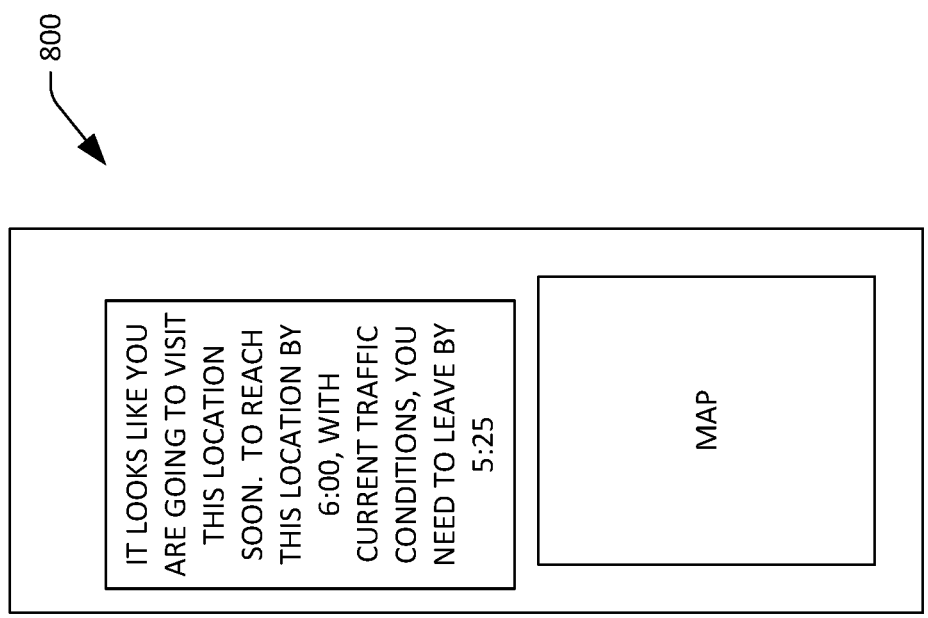
FIG. 8 is a graphical user interface that is configured to present a user with a notification or recommendation based upon a predicted routine of the user.

Turning now to FIG. 8, an exemplary graphical user interface (GUI) 800 is illustrated. For instance, the GUI 800 may be for a digital personal assistant. The GUI 800 includes a notification set forth to the user that the user is to leave his or her current location at a certain time to reach a place that the user is predicted to visit at a time that the user is predicted to visit the place. This notification can be generated based upon a predicted routine output by the routine predictor module 122 and based upon analysis of traffic. In another example, the notification can be an audio notification presented by a smart speaker. In another example, the GUI can be for a wearable device, such as a watch, and may have haptic feedback associated therewith.

Figure 9:
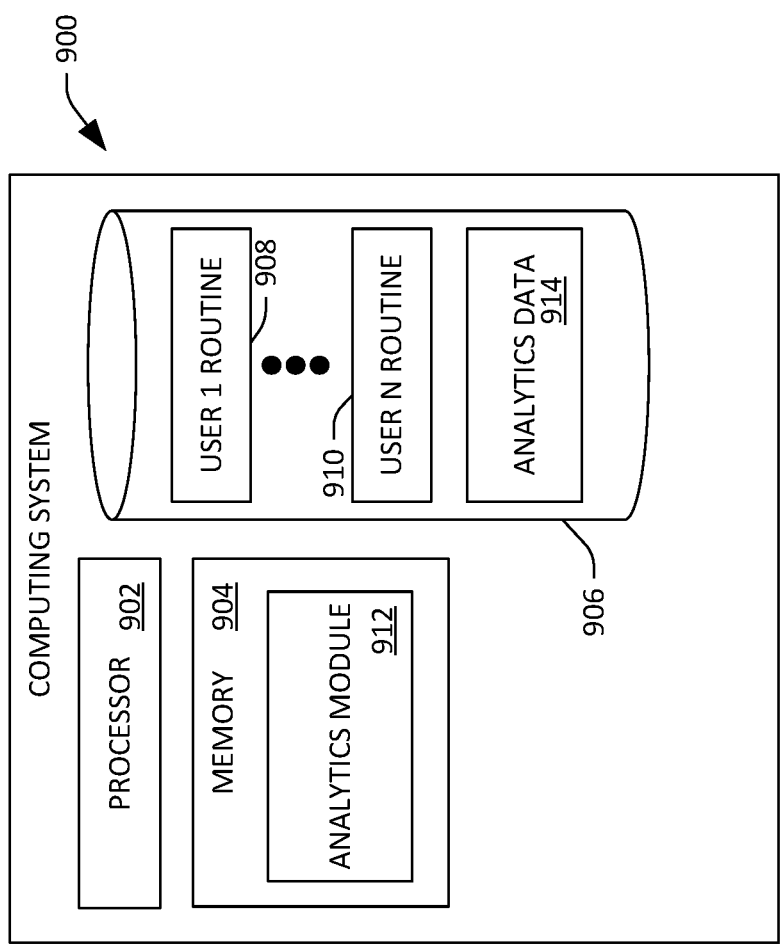
FIG. 9 is a functional block diagram of an exemplary computing system that is configured to generate analytics data based upon multiple predicted routines of users.

With reference now to FIG. 9, another exemplary computing system 900 is illustrated. The computing system 900 includes a processor 902 and memory 904, wherein the memory 904 has instructions stored therein that are executed by the processor 902. The computing system 900 also comprises a data store 906, wherein the data store 906 stores several predicted user routines 908-910. The predicted user routines 908-910 can correspond to a same future window of time, can correspond to different but overlapping future windows of time, or can correspond to non-overlapping future windows of time. Further, in an example, the predicted user routines 908-910 can be for users who reside in a same area (e.g., city, state, or country), users who are of similar age, users who have similar interests, etc.). The predicted user routines 908-910 can be generated by the computing system 100, wherein each of the predicted user routines 908-910 can be predicted routines for a different respective user.

The memory 904 has an analytics module 912 loaded therein, wherein the analytics module 912 receives the predicted user routines 908-910 and generates analytics data 914 based upon the predicted user routines 908-910. For example, the analytics data 914 can indicate when a relatively large number of users are predicted to be at a particular place, can indicate that a relatively large number of users go to a first place and immediately afterward go to a second place, and so forth. Hence, the analytics data 914 can include information that may be useful to a city planning department (e.g., a large number of users are expected to be at a public transportation terminal), information that may be useful to a developer (e.g., a large number of users are expected to travel to a bank after grocery shopping), and so forth.

Figure 10:
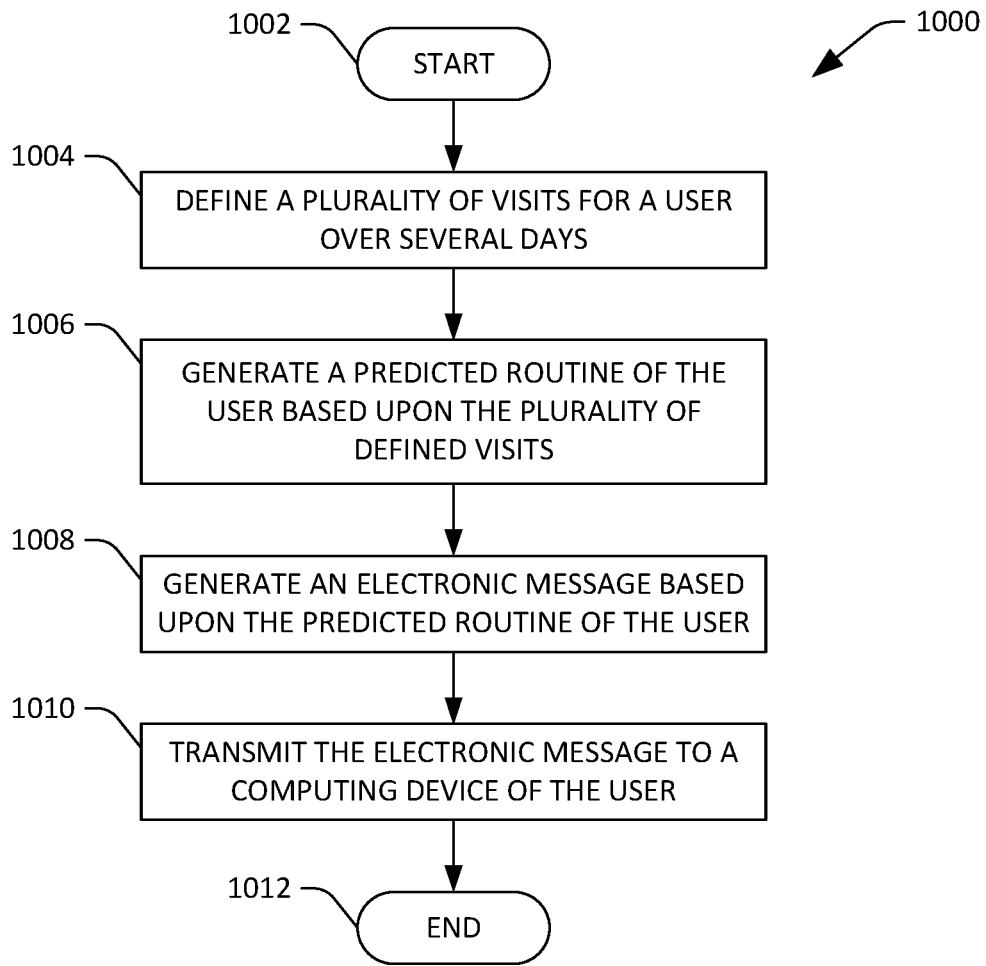
FIG. 10 is a flow diagram illustrating an exemplary methodology for predicting a routine of a user based upon observed visits of the user.

FIG. 10 illustrates an exemplary methodology relating to generating a predicted routine of a user. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

The methodology 1000 starts at 1002, and at 1004 a plurality of visits over a plurality of days are defined for a user, wherein the plurality of visits are defined based upon location data generated by a mobile computing device of the user. Each visit in the plurality of visits comprises: 1) a date of the visit; 2) an identity of a place that the user visited (where the identity of the place can be a name of the place and/or a category assigned to the place); 3) a start time of the visit, which identifies when the location data generated by the mobile computing device indicates that the mobile computing device arrived at the place; and 4) data that is indicative of a duration of the visit, wherein the duration of the visit is an amount of time that the mobile computing device is determined to be at the place from the start time to when the mobile computing device departed the place.

At 1006, based upon the plurality of visits over the plurality of days, a predicted routine of the user is generated. The predicted routine includes a plurality of future locations of the user during a respective plurality of time blocks in the future, wherein the time blocks are of a predefined length, and further wherein the plurality of time blocks are consecutive and cover several days. For instance, a frequent itemset mining algorithm can be used to generate the predicted routine. In another example, a sequence to sequence model that includes several RNNs can be used to generate the predicted routine. In yet another example, a MTCN can be employed to generate the predicted routine.

At 1008, an electronic message is generated based upon a predicted location of the user for a future time block in the predicted routine. The electronic message can be a notification (e.g., "leave at 6:00 PM"), can be a recommendation (e.g., "I predict that you will be at the grocery store tomorrow—here is a recommended product that is on sale"), or other suitable electronic message. At 1010, the electronic message is transmitted to the mobile computing device of the user or to a second computing device. The methodology 1000 completes at 1012.

Figure 11:
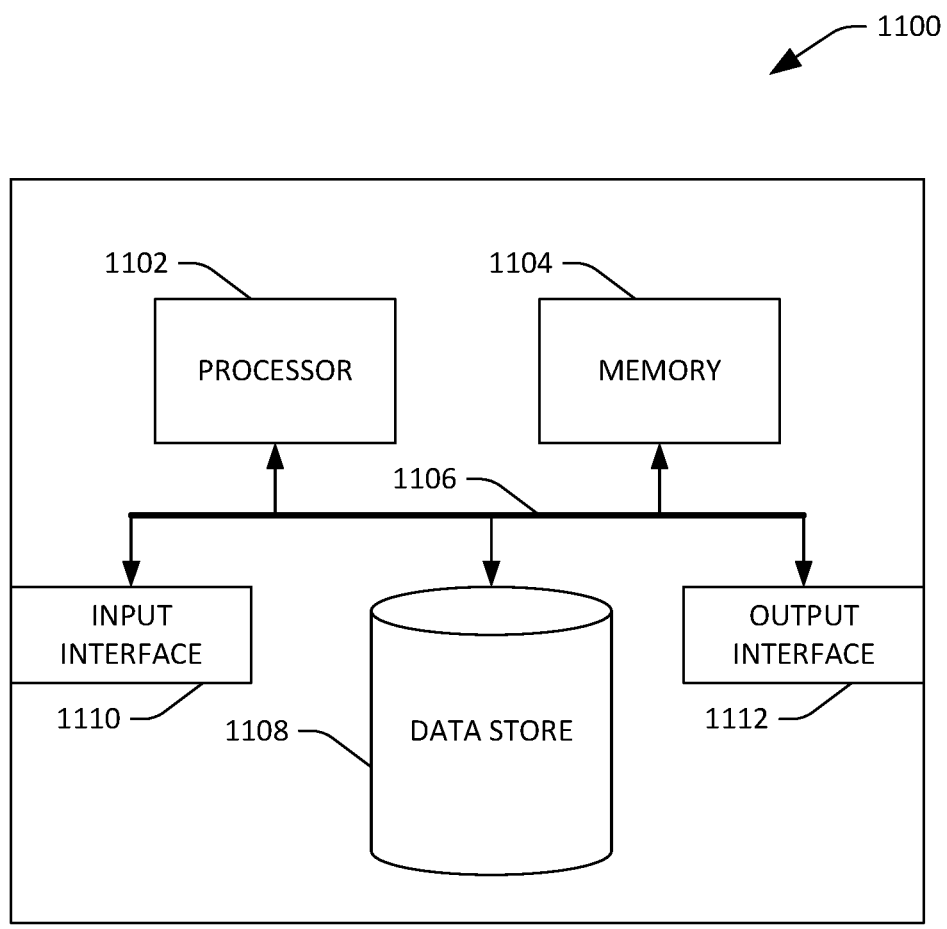
FIG. 11 is a functional block diagram of an exemplary computing system.

Referring now to FIG. 11, a high-level illustration of an exemplary computing device 1100 that can be used in accordance with the systems and methodologies disclosed herein is illustrated. For instance, the computing device 1100 may be used in a system that supports generating a predicted routine of a user. By way of another example, the computing device 1100 can be used in a system that is configured to train a MTCN. The computing device 1100 includes at least one processor 1102 that executes instructions that are stored in a memory 1104. The instructions may be, for instance, instructions for implementing functionality described as being carried out by one or more components discussed above or instructions for implementing one or more of the methods described above. The processor 1102 may access the memory 1104 by way of a system bus 1106. In addition to storing executable instructions, the memory 1104 may also store location entries generated by mobile computing devices, visit entries, etc.

The computing device 1100 additionally includes a data store 1108 that is accessible by the processor 1102 by way of the system bus 1106. The data store 1108 may include executable instructions, location entries, visit entries, a sequence of states, etc. The computing device 1100 also includes an input interface 1110 that allows external devices to communicate with the computing device 1100. For instance, the input interface 1110 may be used to receive instructions from an external computer device, from a user, etc. The computing device 1100 also includes an output interface 1112 that interfaces the computing device 1100 with one or more external devices. For example, the computing device 1100 may display text, images, etc. by way of the output interface 1112.

It is contemplated that the external devices that communicate with the computing device 1100 via the input interface 1110 and the output interface 1112 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1100 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1100 may be a distributed system. Thus, for instance, several devices may be in communication by way of a network connection and may collectively perform tasks described as being performed by the computing device 1100.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for updating a computer-implemented calendar of a user based upon a routine predicted for the user, the method comprising:
    predicting the routine for the user based upon location data generated by a mobile computing device over a period of at least two days, wherein predicting the routine of the user comprises:
        dividing a future window of time into contiguous blocks of time, wherein the future window of time includes at least two upcoming days, and further wherein the contiguous blocks of time are of equivalent length; and
        for all blocks of time in the contiguous blocks of time, assigning respective labels to the blocks of time, wherein the labels identify places where the user is predicted to be during the blocks of time;
    based upon the predicted routine for the user, generating a calendar entry for the user, wherein the calendar entry is for a block of time in the contiguous blocks of time, and further wherein the calendar entry identifies a place where the user is predicted to be during the block of time based on the assigned label for the block of time; and
    sending the calendar entry to the user.

2. The method of claim 1, wherein predicting the routine for the user comprises:
    generating visit entries based upon the location data generated by the mobile computing device of the user, wherein the visit entries are for a previous window of time, and further wherein each visit entry comprises:
        a date of a visit;
        an identity of a place of the visit;
        a start time of the visit, wherein the start time identifies when the location data generated by the mobile computing device indicates that the mobile computing device arrived at the place; and
        data that is indicative of a duration of the visit, wherein the duration of the visit is an amount of time that the mobile computing device was determined to be at the place from the start time to when the mobile computing device departed the place, wherein the visit entries collectively correspond to the at least two days.

3. The method of claim 2, wherein generating the visit entries comprises clustering location entries in the location data to generate location clusters, wherein each location entry includes a latitude/longitude pair and a timestamp, and further wherein the location entries are clustered as a function of time and space.

4. The method of claim 1, wherein the future window of time is between one day and two weeks.

5. The method of claim 4, wherein the length of the contiguous blocks of time is one of fifteen minutes, thirty minutes, or one hour.

6. The method of claim 1, further comprising:
based upon a label assigned to a second block of time in the contiguous blocks of time, generating an electronic message; and
transmitting the electronic message to the mobile computing device of the user.

7. The method of claim 6, wherein the electronic message includes a reminder to complete a task that is assigned to a second place that is identified by the label.

8. The method of claim 6, wherein the electronic message includes a recommendation to visit a second place, wherein the second place is recommended to visit based upon a third place that is identified by the label.

9. A computing system comprising:
a processor; and
memory storing instructions that, when executed by the processor, cause the processor to perform acts comprising:
based upon location data generated by a mobile computing device of a user over several days, generating a predicted routine of the user, wherein the predicted routine of the user comprises a sequence of labels assigned to a sequence of contiguous time blocks over a future window of time, wherein:
each time block in the sequence of contiguous time blocks has a respective label assigned thereto;
each time block in the sequence of contiguous time has a same length;
the future window of time includes at least one day; and
the labels identify places where the user is predicted to be during the sequence of contiguous time blocks over the future window of time;
based upon a label assigned to a time block in the predicted routine of the user, updating an electronic calendar of the user to include a calendar entry for the time block, wherein the calendar entry includes an identity of a place identified by the label; and
transmitting the calendar entry to a computing device of the user.

10. The system of claim 9, wherein the future window of time comprises a week.

11. The system of claim 9, wherein each time block in the sequence of contiguous time blocks is one half hour in length.

12. The system of claim 9, wherein generating the predicted routine of the user comprises:
generating a second sequence of labels for a second sequence of contiguous time blocks included in the several days, wherein the second sequence of labels identifies places visited by the user during the several days, wherein the predicted routine of the user is generated based upon the second sequence of labels.

13. The system of claim 12, wherein each time block in the second sequence of contiguous time blocks is of equivalent length.

14. The system of claim 12, wherein generating the predicted routine of the user further comprises providing the second sequence of labels to a convolutional neural network as input to the convolutional neural network, wherein the convolutional neural network is configured to output the predicted routine of the user based upon the second sequence of labels.

15. The system of claim 14, wherein the convolutional neural network is a masked time dilated convolutional neural network.

16. The system of claim 9, the acts further comprising:
based upon a second label assigned to a second time block in the sequence of contiguous time blocks, generating an electronic message; and
transmitting the electronic message to the mobile computing device of the user.

17. The system of claim 16, wherein the electronic message includes a reminder to complete a task that is assigned to a second place that is identified by the second label.

18. The system of claim 16, wherein the electronic message includes a recommendation to visit a second place, wherein the second place is recommended to visit based upon a third place that is identified by the second label.

19. A computer-readable storage medium comprising instructions that, when executed by a processor, cause the processor to perform acts comprising:
predicting a routine for a user based upon location data generated by a mobile computing device of the user over a period of at least two days, wherein predicting the routine of the user comprises:
dividing a future window of time into contiguous blocks of time, wherein the future window of time includes at least two upcoming days, and further wherein the contiguous blocks of time are of equivalent length; and
for all blocks of time in the contiguous blocks of time, assigning respective labels to the blocks of time, wherein the labels identify places where the user is predicted to be during the blocks of time;
based upon the predicted routine for the user, generating a calendar entry for the user, wherein the calendar entry is for a block of time in the contiguous blocks of time, and further wherein the calendar entry identifies a place where the user is predicted to be during the block of time based on the assigned label for the block of time; and
sending the calendar entry to the user.

20. The computer-readable storage medium of claim 19, wherein predicting the routine for the user comprises:
generating visit entries based upon the location data generated by the mobile computing device of the user, wherein the visit entries are for a previous window of time, and further wherein each visit entry comprises:
a date of a visit;
an identity of a place of the visit;
a start time of the visit, wherein the start time identifies when the location data generated by the mobile computing device indicates that the mobile computing device arrived at the place; and
data that is indicative of a duration of the visit, wherein the duration of the visit is an amount of time that the mobile computing device was determined to be at the place from the start time to when the mobile computing device departed the place, wherein the visit entries collectively correspond to the at least two days.

* * * * *